No. 805,560.　　　　　　　　　　　　　PATENTED NOV. 28, 1905.
S. N. KOHN.
GERMICIDAL CAKE.
APPLICATION FILED MAY 1, 1905.

Witnesses.
E. B. Gilchrist
N. L. Brennan

Inventor
Simon N. Kohn,
By his Attorneys,
Thurston & Bates

UNITED STATES PATENT OFFICE.

SIMON N. KOHN, OF CLEVELAND, OHIO.

GERMICIDAL CAKE.

No. 805,560.     Specification of Letters Patent.     Patented Nov. 28, 1905.

Application filed May 1, 1905. Serial No. 258,174.

*To all whom it may concern:*

Be it known that I, SIMON N. KOHN, a citizen of the United States, residing at Cleveland, in the county of Cuyahoga and State of Ohio, have invented a certain new and useful Improvement in Germicidal Cakes, of which the following is a full, clear, and exact description, reference being had to the accompanying drawings.

The object of this invention is to provide a germicide in such form that it may be easily secured within a vessel—as a cuspidor, for example—and by slowly dissolving in the water in the vessel maintain the same in a sterilized condition. I accomplish this by means of a cake composed of a slowly-soluble germicide and an insoluble adhesive. By this means the germicide is retained within the vessel, slowly dissolving therein and sterilizing the water, killing tubercle and other germs. The germicide may be thus applied to cuspidors and other containers in hotels, hospitals, and public places generally, as well as in the sick-room of a consumptive.

The adhesive is preferably some waxy substance, such as beeswax, insoluble in water and fusible by a slight heat, so that simply by a match it may be sufficiently softened to cause it to adhere to a metal or earthenware vessel. The germicide may be any suitable germicidal substance which will be slowly soluble, and thus keep the water saturated, the undissolved part retaining its cake form. I prefer to use the germicide known as "benaphol," which has the following characteristics: Its solubility is about one ounce to six gallons of water, ordinary temperature. Its antiseptic value is about five times that of carbolic acid. In solution it positively destroys pathogenic germs, such as those of typhoid fever and tuberculosis. It positively arrests putrefaction when in full development. It is practically non-toxic. It is odorless, neutral, and non-corrosive. The portion dissolved does not afterward settle or decompose and the undissolved portion retains its cake form until all has been used.

My germicidal cake may be easily applied to the vessel by slightly heating the adhesive and will remain in position for many weeks, though the water in the vessel is daily changed, and will maintain such water sterilized throughout the time. Preferably the germicidal and adhesive portions of the cake are of different colors, (as white for the germicide and brown for the adhesive,) so that it may be easily observed when the germicide is entirely dissolved.

The drawings illustrate the invention as applied to a cuspidor.

Figure 1:
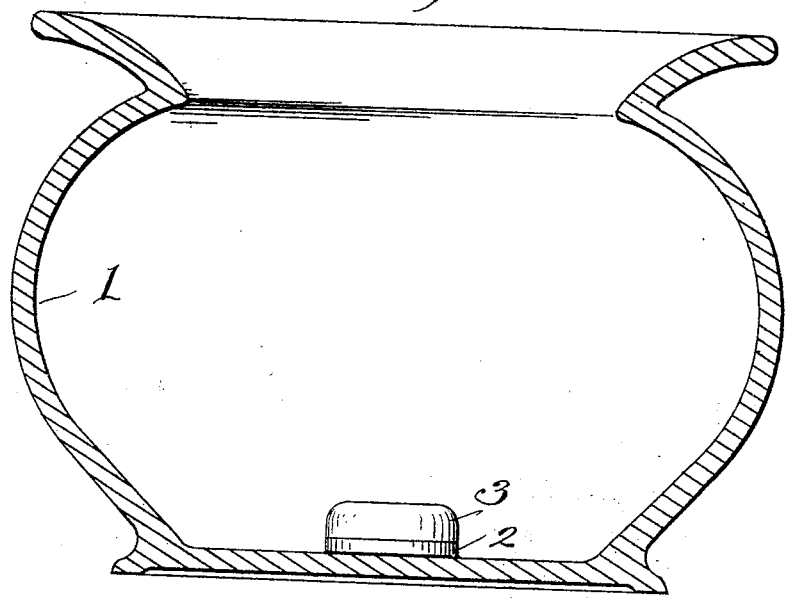
Figure 2:
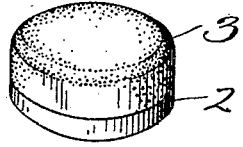
Figure 3:

Figure 1 is a vertical cross-section of the cuspidor, showing the cake in position. Fig. 2 is a perspective view of the cake, and Fig. 3 a cross-section thereof.

As shown in the drawings, the cuspidor or other vessel is represented by 1, the adhesive portion of the cake by 2, and the germicidal portion by 3.

I use the term "germicide" herein as including also algæcides, antiseptics, disinfectants, and deodorizers generally. The specific nature of the soluble substance may thus vary according to the use to which the cake is to be put, for my invention is adaptable for use in sinks, urinals, drains, and various other places, as desired.

I claim—

1. A germicidal cake comprising a germicide and an adhesive insoluble in water.

2. A germicidal cake, comprising a soluble germicide and an adhesive insoluble in water.

3. A germicidal cake comprising a solid soluble germicide, and a solid adhesive insoluble in water.

4. A germicidal cake comprising a germicide and an adhesive adhering thereto, the adhesive insoluble in water and germicide being of different colors.

5. A germicidal cake comprising a solid slowly-soluble germicide, the undissolved portion being adapted to retain its form under water, and a fusible adhesive insoluble in water adhering to the germicide.

In testimony whereof I hereunto affix my signature in the presence of two witnesses.

SIMON N. KOHN.

Witnesses:
ALBERT H. BATES,
N. L. BRESNAN.